United States Patent [19]

Nagai et al.

[11] Patent Number: 4,783,783
[45] Date of Patent: Nov. 8, 1988

[54] DATA PROCESSING SYSTEM HAVING PIPELINE ARITHMETIC/LOGIC UNITS

[75] Inventors: Seiji Nagai; Takaaki Nishiyama; Hiromichi Kainoh; Fujio Wakui, all of Hadano, Japan

[73] Assignees: Hitachi, Ltd.; Hitachi Computer Eng. Co., both of Tokyo, Japan

[21] Appl. No.: 888,936

[22] Filed: Jul. 24, 1986

[30] Foreign Application Priority Data

Jul. 29, 1985 [JP] Japan .................... 60-165802

[51] Int. Cl.⁴ .................................. G06F 11/00
[52] U.S. Cl. ........................... 371/12; 364/200
[58] Field of Search ............ 371/51, 12, 13, 16; 364/200 MS File, 900 MS File

[56] References Cited

U.S. PATENT DOCUMENTS 3,274,564 9/1966 Binder .................................. 371/12
3,564,506 2/1971 Bee ..................................... 371/12
4,414,669 11/1983 Heckelman .......................... 371/49

Primary Examiner—Jerry Smith
Assistant Examiner—Robert W. Beausoliel
Attorney, Agent, or Firm—Antonelli, Terry & Wands

[57] ABSTRACT

A data processing system includes a multistage pipeline arithmetic/logic operation unit for implementing an arithmetic or logic operation for sets of element data sequentially and storing operational results sequentially in a memory using a single instruction. Check information indicative of the presence or absence of a fault occurring in each stage of the pipeline operation unit is moved in synchronism with the advancement of stages of the pipeline operation unit. A request control unit for storing the operational result in the memory suppresses the storing of the operational result in the memory if check information indicates a fault of the operational result which is being stored in the memory. The request control unit issues storage requests, which are counted by a counter. The counter indicates the number of elements stored normally in the memory.

5 Claims, 5 Drawing Sheets

DATA PROCESSING SYSTEM HAVING PIPELINE ARITHMETIC/LOGIC UNITS

BACKGROUND OF THE INVENTION

This invention relates to a data processing system having pipeline arithmetic/logic units and, more particularly, to the fault processing in a data processing system which is suitable for handling vector instructions.

Vector instruction processing by a data processing system is carried out in the manner of implementing by a single instruction the same process for sets of data (also called "elements"), as is known in the art. The system generally employs a pipeline arithmetic/logic unit (ALU). The pipeline ALU consists of several stages, implementing the same arithmetic/logic operation specified by the instruction for elements which are entered successively at the clock interval and outputting operational results at the clock interval. The operational results are stored sequentially through the store data buffer into a memory (e.g., main storage).

In such a data processing system, if a fault occurs in the pipeline ALU, it is necessary for the system to suspend the storing of resultant data to the memory and reexecute the instruction. U.S. Pat. No. 4,318,172 discloses the fault processing, in which data once held in the store data buffer is discriminated to be capable or incapable of retry at the occurrence of the fault, and the instruction is reexecuted by invalidating the held data which is determined to be capable of retry or storing the held data which is determined to be incapable of retry in the memory. This method is effective for instructions each implementing an arithmetic/logic operation for a set of data and storing the result by itself. However, the above method is hardly applicable to the occurrence of a fault during the process of an instruction such as a vector instruction which implements the same processing for sets of data using a pipeline ALU and stores the results. Particularly, when it is intended to retry an element at which a fault has occurred, instead of reexecuting the whole instruction, the method involves difficult factors such as the determination of the element number to be resumed. It is prohibited for data processing systems to write the same address location of the main storage twice during one instruction execution, and it is necessary to resume the execution in compliance with this rule.

SUMMARY OF THE INVENTION

An object of this invention is to provide a data processing system which enables resumption of execution at the element which has caused a fault.

This invention is intended to transmit information indicative of a fault which would occur in each stage of the pipeline ALU in synchronism with the progress of the stage. A request control unit issues a memory store request for storing the operational result in the memory. A request control means suppresses the issuance of the store request in response to the fault information corresponding to the operational result which is about to be stored in the memory. The number of store requests is counted by a counter, which indicates the number of elements executed normally before the occurrence of the fault, and the count value can be used for retry.

DESCRIPTION OF THE PREFERRED EMBODIMENT

Figure 1:
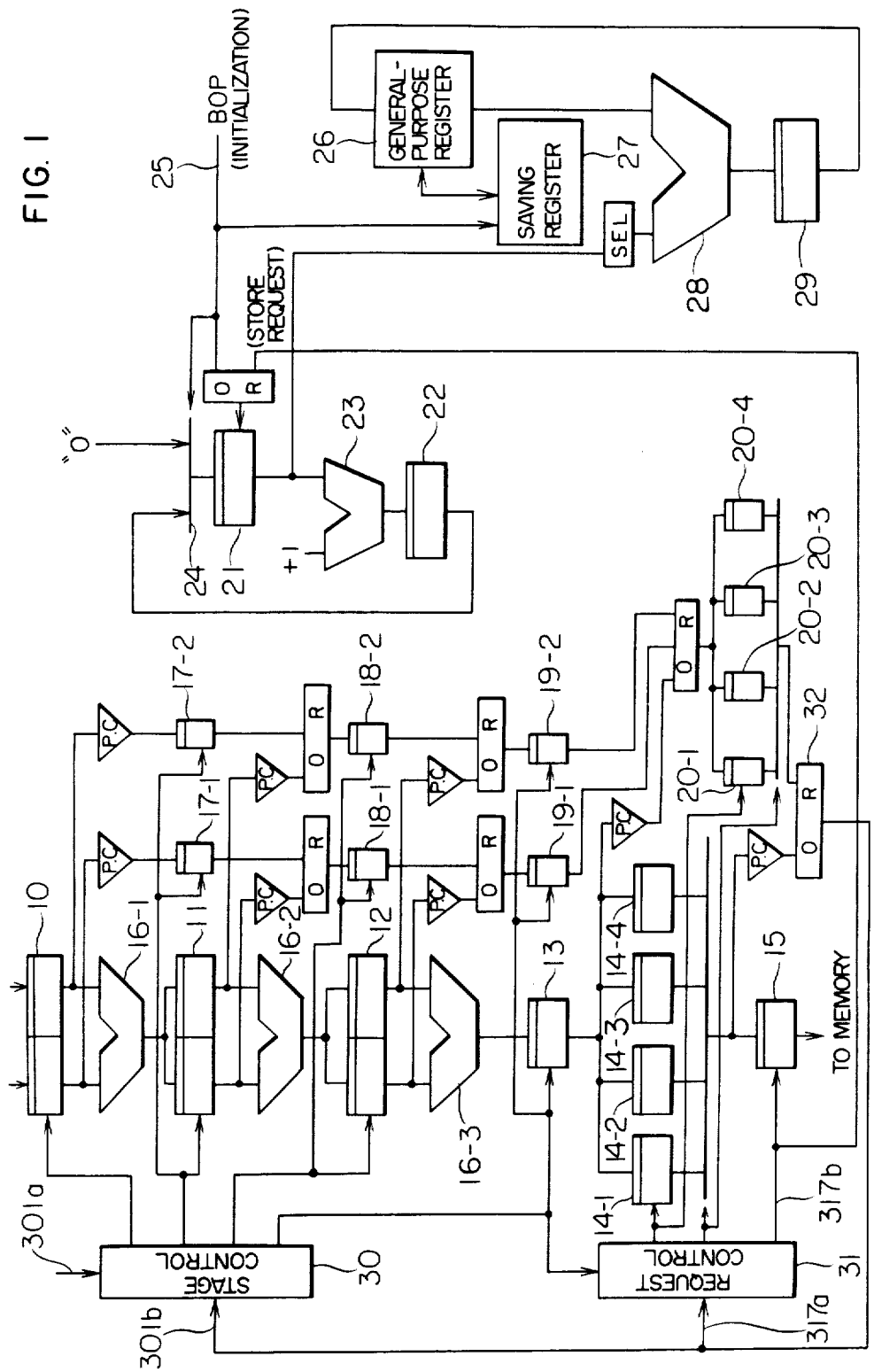
FIG. 1 is a block diagram showing an embodiment of this invention.

An embodiment of this invention will now be described with reference to the drawings. FIG. 1 shows an embodiment of this invention, in which a pipeline arithmetic/logic unit (ALU) consists of three stages. Each element data is set in the input register 10, it is clocked into the first-stage ALU 16-1 to the second-stage ALU 16-2 to the third-stage ALU 16-3, and to the result register 13. Operational registers 11 and 12 are used to hold intermediate results. For floating-point operations, the first-stage ALU 16-1 implements prenormalization, the second-stage ALU 16-2 implements addition, subtraction or the like, and the third-stage ALU 16-3 implements postnormalization. The input register 10 is connected to parity checkers PCs which implement a parity check for input data. The check results are set in the check latches 17-1 and 17-2. The operational registers 11 and 12 are also connected to parity checkers PCs, and their check results are set in respective check latches 18-1, 18-2, 19-1 and 19-2. These latches are also set by the output of the check latches of the preceding stages through respective OR gates.

Figure 2:
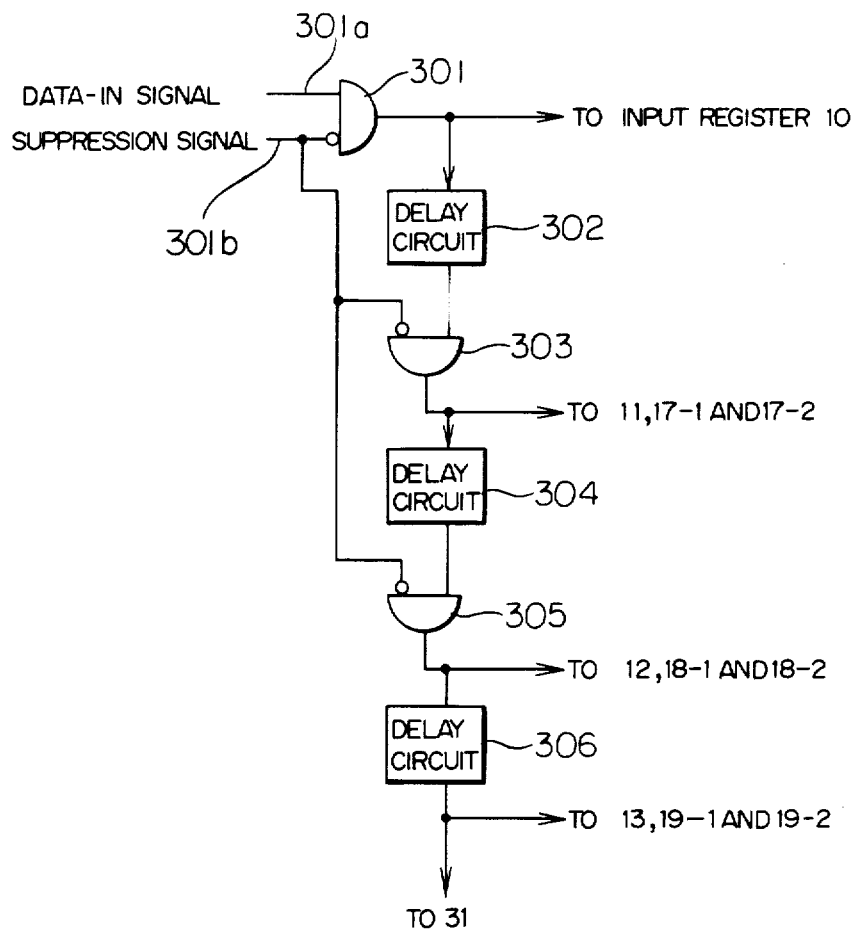
FIG. 2 is a block diagram showing in detail the stage control circuit in FIG. 1.

The stage of the pipeline ALU is shifted by the stage control circuit 30. In FIG. 2 showing a specific example of the stage control circuit 30, an AND gate 301 receives the data-in signal indicative of data fetching from the execution control unit (not shown) over the line 301a and the suppression signal caused by the occurrence of a fault over the line 301b. The AND gate 301 provides its output to the input register 10 (FIG. 1) as a set signal, so that input data is set in the register 10 in response to the presence of the data signal on the line 301a and the absence of the suppression signal on the line 301b. The output of the AND gate 301 is also received by another AND gate 303 via a delay circuit 302 which applies delay to the signal by the time equal to the operational period (1 clock period) of the corresponding ALU 16-1. The AND gate 303 is enabled in response to the signal from the delay circuit 302 and the absence of the suppression signal on the line 301 b to set the output of the ALU 16-1 in the register 11. The output of the AND gate 303 is also given to the check latches 17-1 and 17-2 for setting the outputs of the parity check circuits PCs. Delay circuits 304 and 306 and AND gate 305 operate in the same manner. Consequently, element data entered successively at the clock interval are shifted to the following stages sequentially under control of the stage control circuit 30, and the results are sent to the output register 13 consecutively. The outputs of the check latches 17-1 through 19-2 are also shifted in the same manner.

Referring back to FIG. 1, the output of the output register 13 is set in the store buffer made up of four registers 14-1 through 14-4. The check latches 20-1 through 20-4 are in correspondence to the registers 14-1 through 14-4, and are adapted to receive the output of the parity checker PC for the output register 13 or the output of the check latch 19-1 or 19-2 through the OR gate. The output of the store buffer is set in the store data register 15, and then stored in the memory.

Figure 3:
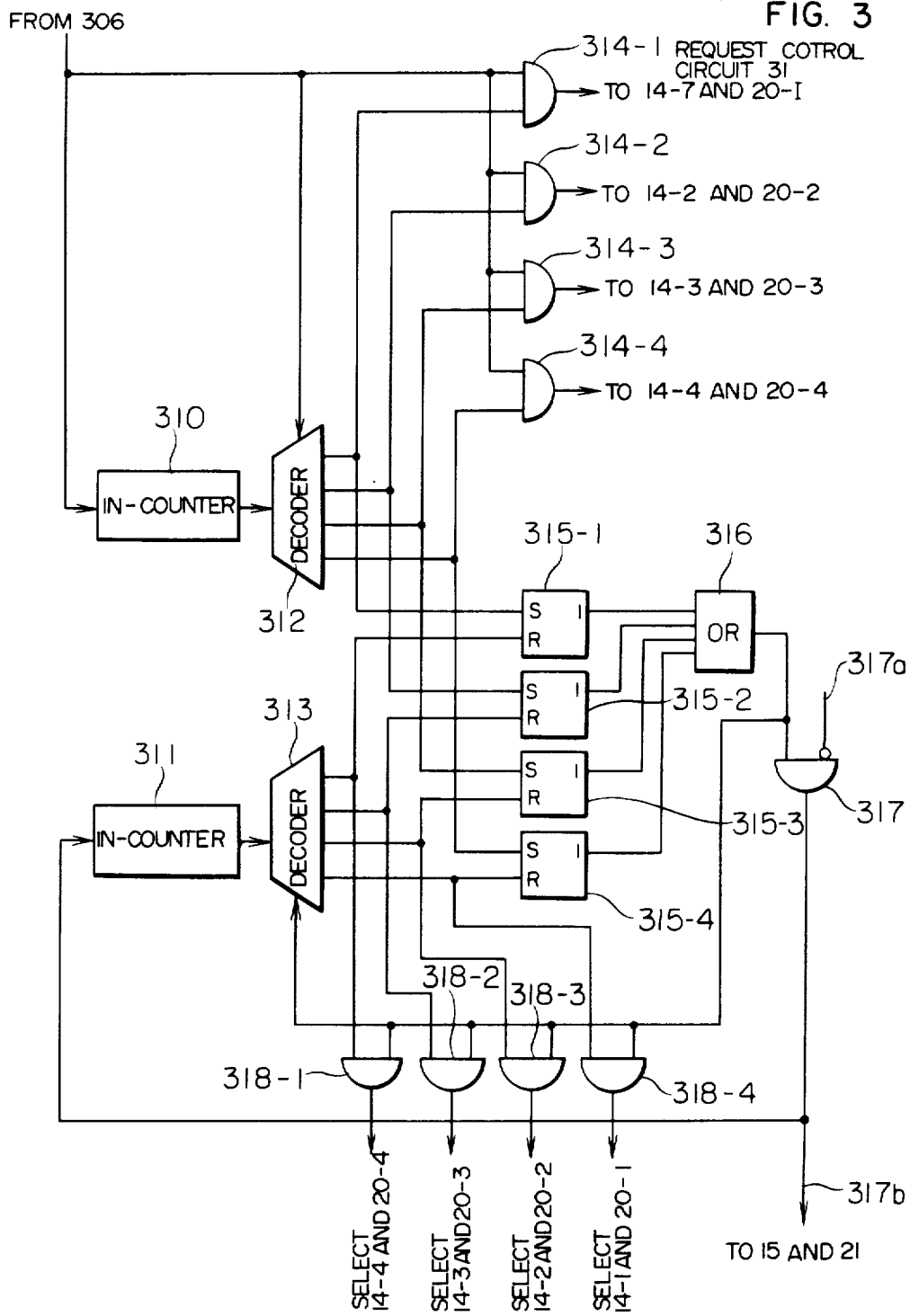
FIG. 3 is a block diagram showing in detail the request control circuit in FIG. 1.

The store buffer is controlled for input and output by the request control circuit 31. FIG. 3 shows a specific example of the request control circuit 31. The request control circuit 31 incorporates flip-flops 315-1 through 315-4 in correspondence with the registers 14-1 through 14-4, each indicating whether or not data to be stored in the corresponding register is set. The in-counter 310 is a 2-bit counter, capable of selecting one of the four registers 14-1 through 14-4 of the store buffer, and it counts up by one in response to a signal from the delay circuit 306 shown in FIG. 2. The in-counter 310 is initially "00", counts up to "11", and then returns to "00". The purpose of the in-counter 310 is to specify one of registers 14-1 through 14-4 to store data from the output register 13 in accordance with the decoded signal provided by the decoder 312. The decoder 312 is activated by the output of the delay circuit 306 to decode the count of the in-counter 310 before it counts up, and sets one of flip-flops 315-1 through 315-4 in compliance with the following relation between the counter contents and the flip-flops.

| Counter contents | Flip-flop to be set |
| --- | --- |
| 00 | 315-1 |
| 01 | 315-2 |
| 10 | 315-3 |
| 11 | 315-4 |

At the same time when one of the flip-flops is set, one of AND gates 314-1 through 314-4 is enabled. These AND gates are arranged in correspondence with the registers 14-1 through 14-4 of the store buffer, and their outputs are used as set signals for the registers 14-1 through 14-4 for holding data from the output register 13. The AND gate outputs are at the same time given as set signals to the check latches 20-1 through 20-4. Out-counter 311 specifies one of the registers 14-1 through 14-4 of the store buffer from which data is outputted to the store data register 15, and has its output decoded by a decoder 313. OR gate 316 provides the output when at least one of the flip-flops 315-1 through 315-4 is set, i.e., when data to be stored in the store buffer is set, and the OR gate output activates the decoder 313. Consequently, one of AND gates 318-1 through 318-4 indicated by the output of the decoder 313 is enabled, and the contents of a corresponding register 14-1 through 14-4 of the store buffer is delivered to the store data register 15 and one of the check latches 20-1 through 20-4 is enabled to output. The output of the out-counter 311 is further used for resetting one of the flip-flops 315-1 through 315-4. The output of the OR gate 32 (FIG. 1) indicates the validity of the data being stored in the memory. The OR gate output is fed over the line 301 b in FIG. 2 and also over the line 317a in FIG. 3, and used as a suppression signal when the data is faulty. The AND gate 317 is enabled unless data in the selected register is faulty, and its output is sent as a store request signal over the line 317b to the memory. This signal is further used as a set signal to the register 15 and also as an up-count signal to the out-counter 311. In this manner, operational result data set temporarily in the output register 13 are held in the store buffer registers 14-1 through 14-4 sequentially, fed via the store data register 15 sequentially, and stored in the memory.

Referring back again to FIG. 1, registers 21 and 22 and a +1 adder 23 in combination constitute a +1 counter circuit. The line 25 is brought to "1" at the beginning of the instruction process (BOP) to select the "0" input on the selector 24 so that the register 21 is initialized to "0". With the line 25 being "0", the selector 24 selects the output of the register 22, and it receives a value added by one each time the set signal is issued by the request control circuit 31 to the register 21 over the line 317b. Accordingly, the register 21 indicates the number of elements stored in the memory, and thus serves as an element counter register.

Figure 4:
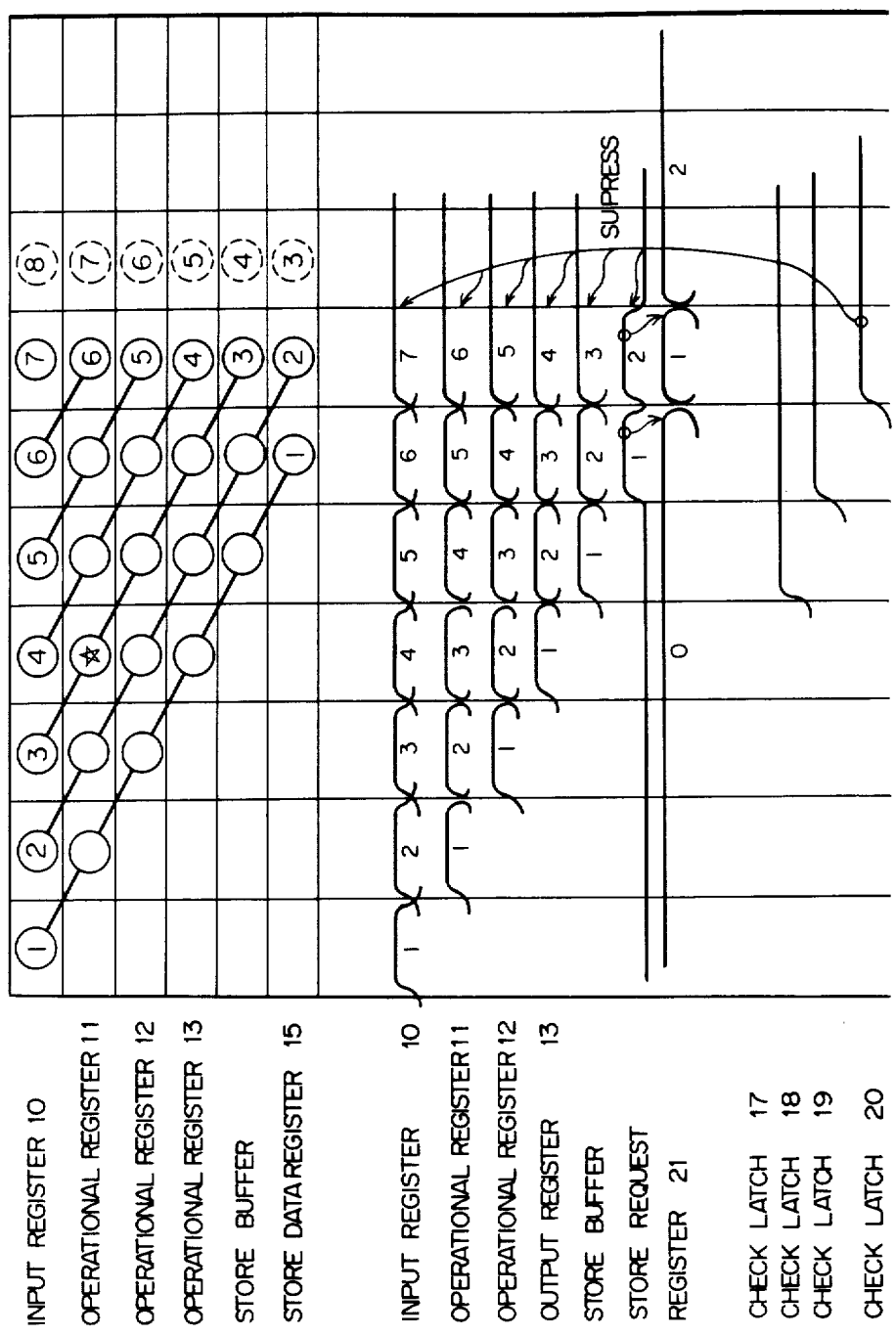
FIG. 4 is a timing chart used to explain the operation of FIG. 1.

FIG. 4 shows a timing chart for the basic operation of the foregoing circuit arrangement in the occurrence of a fault. Numerals in the figure represent the element number, and the timing chart shows the occurrence of a fault (indicated by the star mark) in the operational register 11 which holds the intermediate operational result for element number 3. When a fault occurs in a vector instruction, the element is entered in the store buffer, and the operational process for the previous element takes place until the store request is issued. At the arrival of the stage in which the fault-causing element is stored, the store request for that element is suppressed and the following operational process is also suspended. In the case of FIG. 4, a fault occurs at data with element number 3, and therefore the register 21 indicates "2" in its suppression state.

In FIG. 1, a general-purpose register 26 holds the number of elements processed by one vector instruction, and it is saved in a saving register 27 at the beginning of the instruction (BOP).

Figure 5:
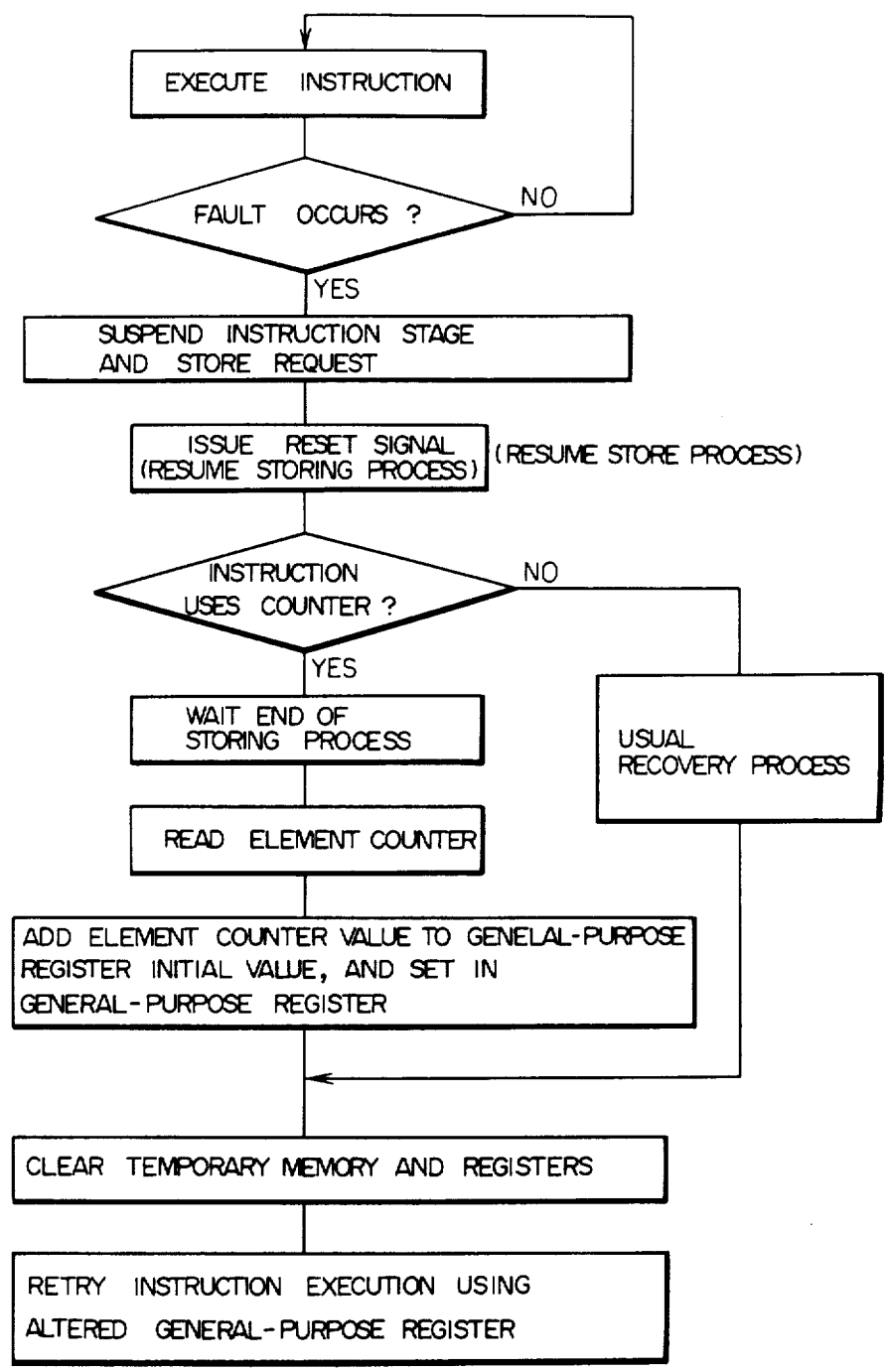
FIG. 5 is a flowchart explaining the procedure of instruction retry according to this invention.

FIG. 5 shows the process up to the retry of instruction execution when a fault has occurred. At the arrival of the stage in which a fault-causing element is stored, the occurrence of the fault is recognized, the store request for that element is suppressed, and the following operational process is also suspended. Subsequently, the reset signal due to the occurrence of the fault is issued, which cancels the request control stage, and the data recovery process by the microprogram is commenced. At first, the instruction code is referenced at the beginning (BOP) to determine whether it is a vector instruction using a counter. If it is a vector instruction using a counter, the number of elements for which the store process has been conducted is read out of the element counter 21 described above, the contents of the register 27 which has been saved at the previous BOP is restored in the general-purpose register 26 (in which the first element number to be processed by the vector instruction is held), it is added to the above-mentioned element number by the adder 28, and the result is set via the register 29 in the original register 26. By this process, the fault-causing element number is stored in the general-purpose register used by the vector instruction, and the execution will resume at the fault-causing element in the retry process. Subsequently, memories other than the main storage (i.e., temporary memory, etc.) and registers are cleared so as to prevent inconsistency with data stored in the main storage, and the instruction is reexecuted. In the example of FIG. 4, the fact that the operational result up to the second element is stored in the main storage is known by the element counter 21, and the instruction execution will resume at the vector element number corresponding to the third element.

The inventive system eliminates the need of testing by a microprogram or the like as to whether the store request has been cancelled, facilitating the recovery process at the occurrence of faults. The inventive system allows the resumption of execution at an intermediate element of an instruction even in the case of a fault arising during the process of a vector instruction, whereby the reliability of the information processing system can be enhanced.

We claim:

1. A data processing system in which a plurality of element data are subject to an arithmetic or logic operation sequentially by a single instruction and operational results for sets of said element data are stored sequentially in a memory by said instruction, comprising:

pipeline arithmetic and logic operation means including a plurality of stages connected in series are performing an arithmetic or logic operation specified by said instruction sequentially operating on said sets of element data while passing said sets of element data through said stages;

check information means for transmitting check information indicative of the presence or absence of a fault occurring in each of said stages in synchronism with the flow of said element data in said pipeline arithmetic and logic operation means;

request control means for issuing a store request to said memory each time an operational result of each set of element data is obtained while passing through said stages for sequentially storing said operational results of said respective sets of element data in said memory in response to a signal from said pipeline arithmetic and logic operation means; and counter means for counting the number of store requests issued by said request control means, said request control means including first suppressing means for suppressing the issuance of said store request in response to said check information being indicative of a fault in said operational result which is being stored in said memory.

2. A data processing system according to claim 1, wherein said check information means includes a plurality of latch means connected in series each corresponding to a stage of said pipeline arithmetic and logic operation means.

3. A data processing system according to claim 2, wherein said pipeline operation means includes stage control means for controlling advancement of said sets of element data through said plurality of stages of said pipeline arithmetic and logic operation means and for controlling latching of said check information in said latch means in synchronism with the advancement of said sets of element data.

4. A data processing system according to claim 3, wherein said request control means includes a store buffer for storing and outputting, in the order of entry, said operational results from said pipeline arithmetic and logic operation means, and latch means for storing, in the order of entry, said check information from check information means and for outputting, in the order of entry, said check information to said first suppressing means.

5. A data processing system according to claim 4, wherein said stage control means includes second suppressing means for suppressing the advancement of said sets of element data in response to said check information being indicative of a fault in an operational result which is being stored in said memory.

* * * * *